(12) United States Patent
Buckwalter et al.

(10) Patent No.: US 8,635,167 B2
(45) Date of Patent: *Jan. 21, 2014

(54) METHOD AND SYSTEM FOR IDENTIFYING PEOPLE WHO ARE LIKELY TO HAVE A SUCCESSFUL RELATIONSHIP

(75) Inventors: J. Galen Buckwalter, Pasadena, CA (US); Steven R. Carter, Los Angeles, CA (US); Gregory T. Forgatch, San Marino, CA (US); Thomas D. Parsons, Pasadena, CA (US); Neil Clark Warren, Pasadena, CA (US)

(73) Assignee: eHarmony, Inc., Santa Monica, CA (US)

( * ) Notice: Subject to any disclaimer, the term of this patent is extended or adjusted under 35 U.S.C. 154(b) by 895 days.

This patent is subject to a terminal disclaimer.

(21) Appl. No.: 12/287,705

(22) Filed: Oct. 10, 2008

(65) Prior Publication Data

US 2009/0106043 A1     Apr. 23, 2009

Related U.S. Application Data

(63) Continuation of application No. 10/779,106, filed on Feb. 13, 2004, now Pat. No. 7,454,357, which is a continuation of application No. 09/636,010, filed on Aug. 10, 2000, now Pat. No. 6,735,568.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 40/02* | (2012.01) |
| *G06Q 99/00* | (2006.01) |

(52) U.S. Cl.
USPC ........................................................ 705/319

(58) Field of Classification Search
USPC .................................................. 705/1.1, 319
See application file for complete search history.

(56) References Cited

U.S. PATENT DOCUMENTS

| | | | |
|---|---|---|---|
| 5,086,394 A | 2/1992 | Shapira | |
| 5,613,205 A | 3/1997 | Dufour | |
| 5,659,731 A | 8/1997 | Gustafson | |
| 5,775,695 A | 7/1998 | Byers | |
| 6,144,964 A * | 11/2000 | Breese et al. | ................ 707/758 |
| 6,272,467 B1 * | 8/2001 | Durand et al. | .................... 705/5 |
| 6,425,012 B1 | 7/2002 | Trovato et al. | |
| 7,401,098 B2 | 7/2008 | Baker | |

OTHER PUBLICATIONS

Alexander I. Zelitchenko; "Information Retrieval Expert System 'Matchmaker'"; Computers in Human Behavior; vol. 8 (pp. 281-296); 1992.

(Continued)

*Primary Examiner* — Jonathan Ouellette
(74) *Attorney, Agent, or Firm* — Van Pelt, Yi & James LLP

(57) ABSTRACT

The functions and operations of a matching service are disclosed. This includes approximating the satisfaction that a user of the matching service has in the relationships that the user forms with others and identifying candidates for a relationship with the user based on the approximated satisfaction. This also includes approximating the satisfaction that the user will have in a relationship with a particular candidate. The matching service also identifies two parties for a relationship. The matching service makes available a plurality of communication levels at which the parties can communicate. Each communication level allows the parties to exchange information in a different format. The parties are permitted to exchange information at one of the communication levels.

24 Claims, 12 Drawing Sheets

(56) References Cited

OTHER PUBLICATIONS

Operation Match Questionnaire; Compatibility Research, Inc.; 1996.
Bradford W. Scharlott; "Overcoming Relationship-Initiation Barriers: The Impact of a Computer-Dating System on Sex Role, Shyness, and Appearance Inhibitions"; Computers in Human Behavior; vol. 11, No. 2 (pp. 191-204); 1995.
Cheryl A. Meyer; "The Computer Personals: Meeting Your Match Online"; Link Up: Communications and the Small Computer; vol. 1, No. 10 (pp. 38-40); Jul. 1984.

* cited by examiner $F_1 = f(A, D, G, M)$
$F_2 = f(D, E, R, S)$
$F_3 = f(G, K, P)$

METHOD AND SYSTEM FOR IDENTIFYING PEOPLE WHO ARE LIKELY TO HAVE A SUCCESSFUL RELATIONSHIP

RELATED PATENT APPLICATION

Continuation of application Ser. No. 10/779,106, filed Feb. 13, 2004, now U.S. Pat. No. 7,454,357 which is a Continuation of U.S. application Ser. No. 09/636,010, filed Aug. 10, 2000, now U.S. Pat. No. 6,735,568 which are hereby incorporated by reference.

BACKGROUND

1. Field of the Invention

The invention relates generally to operation of a matching service. Specifically, the invention relates to identifying and providing communication between people who are likely to have a successful relationship.

2. Background of the Invention

A matching service attempts to identify and bring together two or more people that the matching service believes may have a successful relationship. Many matching services identify matches by techniques that find people with common personalities, interests and/or beliefs. However, these matching techniques often do not account for the large number of variables that can determine whether a relationship is successful. Research has shown that the success of human relationships depends on complex interactions between a large number of variables including, but not limited to, personality, socioeconomic status, religion, appearance, ethnic background, energy level, education, interests and appearance. The large number of variables involved in determining relationship success has made predicting the success of a relationship to be very unreliable. Accordingly, matching services are unable to reliably predict relationship success and their clients are often disappointed with the results of their matches. As a result, there is a need for a method of matching people that accounts for the complexity of the relationships between the variables that determine relationship success.

After identifying candidates for a match, many matching services allow the candidates to communicate by telephone or by e-mail. Many people are not comfortable communicating with a new person in such an immediately open format. As a result, many people would be comfortable with a more gradual and less personal introduction to new people. Accordingly, there is a need for providing communication between matched candidates that is comfortable to the candidates.

SUMMARY OF THE INVENTION

The invention relates to the functions and operation of a matching service. The invention, embodied as a method, includes approximating the satisfaction that a user of the matching service has in the relationships that the user forms with others, and identifying candidates for a relationship with the user based on the approximated satisfaction. The method also includes approximating the satisfaction that the user will have in a relationship with a particular candidate.

The method can also include classifying the user based on the approximated satisfaction that the user will have in the relationships that user forms with others. Candidates for matching with the user are identified based on the classification of the user. The satisfaction that the user is likely to have in a relationship with each of the identified candidates is determined in order to identify the one or more candidates with whom the user is most likely to have a successful relationship.

Another method for operating a matching service according to this invention includes receiving a plurality of surveys completed by different users. Each survey includes a plurality of inquiries into matters that are relevant to formation of relationships with other people. At least a portion of the inquiries have answers that are associated with a number. The method also includes using answers which the individuals provide to the inquiries in a factor analysis to identify a plurality of factors. These factors are used to generate an individual satisfaction estimator.

In one embodiment, the invention also includes identifying the factors that most highly predict satisfaction in a relationship.

Still another embodiment of the invention includes inputting into a neural network information provided by a user of the matching service and receiving from the neural network a list of one or more candidates that the neural network has determined will be successful in a relationship with the individual.

Yet another embodiment of the invention includes identifying two parties for a relationship and providing a plurality of communication levels. Each communication level allows the parties to exchange information in a different format. The invention also includes allowing the parties to exchange information at one of the communication levels.

One example of a communication level allows the parties to exchange answer to one or more closed-ended questions written by the matching service. Another example of a communication level allows exchange of open-ended questions written by the matching service. Yet another example of a communication level allows exchange of items selected from a list created by the matching service.

DETAILED DESCRIPTION

Figure 1:
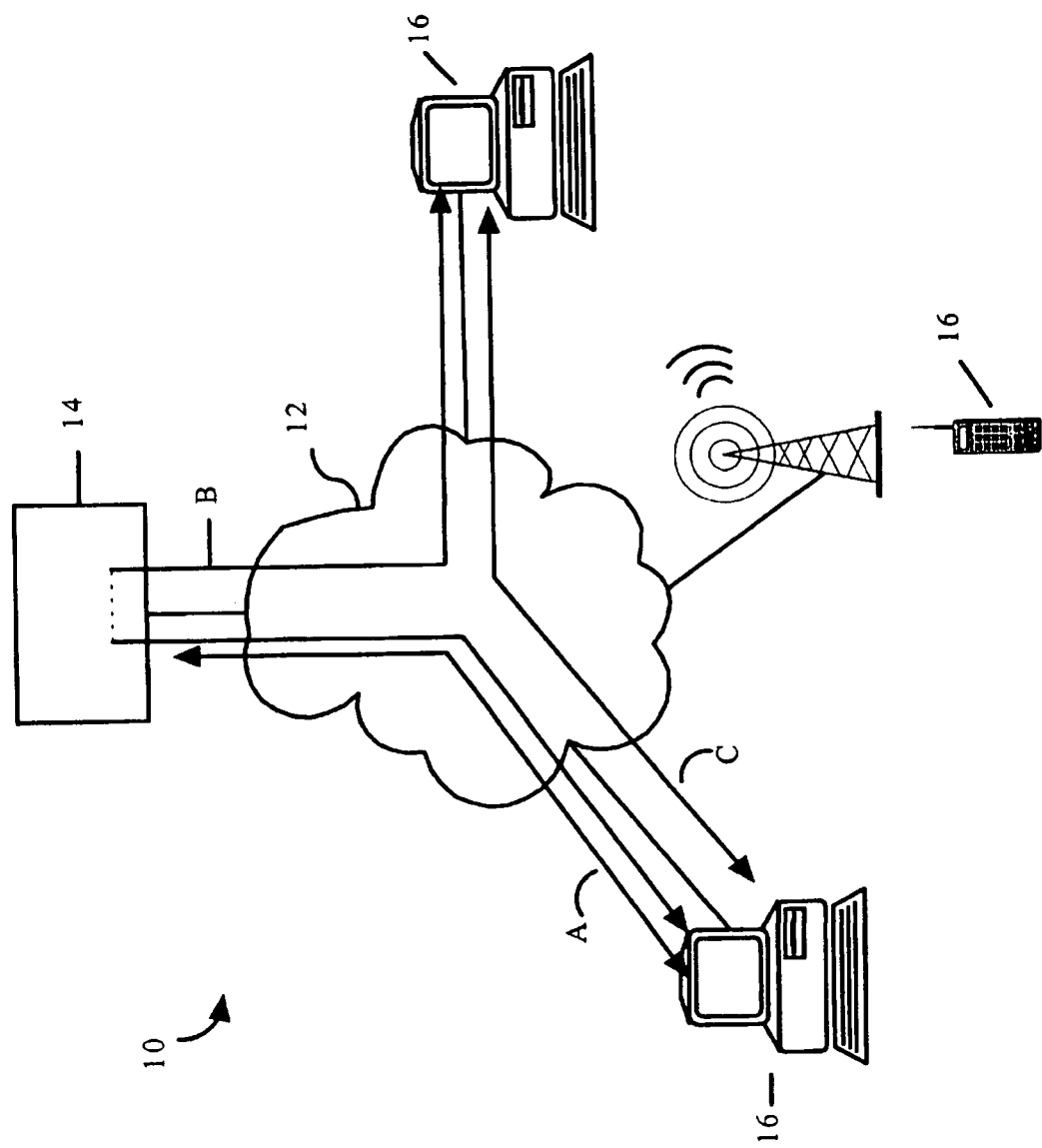
FIG. 1 illustrates a system for matching a user of a matching service with one or more candidates selected from among a pool of candidates.

The invention relates to the functions and operation of a matching service. The matching service employs empirical data to identify and select one or more candidates for a relationship with a user of the service. When the user and one of the selected candidates wish to communicate, the matching service allows them to communicate at a plurality of communication levels. Each of the communication levels allows the parties to exchange information in a different format. Examples of exchanging information at different communication levels include exchanging answers to open-ended questions provided by the matching service, exchanging items selected from a list provided by the matching service, exchanging answers to open-ended questions provided by the matching service and exchanging questions and answers written by the user and/or the candidate.

In one embodiment of the invention there is no sequence assigned to the communication levels and the parties agree on which communication level they will communicate. As a result, people who are uncomfortable meeting someone in a very open format can choose a communication level with a more closed format such as one for exchanging closed-ended-questions.

In another embodiment of the invention, the matching service requires that the parties advance through a particular sequence or hierarchy of communication levels. The matching service can sequence the communication levels to ensure a slow introduction of the two parties. Additionally, the subject matter of the communications can be controlled to limit the exchange of more personal information to later communication levels. The service starts the parties, the user and the candidate, communicating at a particular communication level. In one embodiment, the matching service controls when the parties advance from one communication level to another. In another embodiment, the parties are able to select when they will advance from one communication level to the next level.

The matching service can facilitate each exchange of information by receiving a portion of the communication from one party and then forwarding the communication to the other party. The matching service can modify the communication so the identity of the sending party is concealed. As a result, the communication between the parties remains anonymous.

The identification and selection of particular candidates for a relationship with a user is based on empirical data about people and the satisfaction these people have in their relationships. The matching service prepares the empirical data for use in matching people. The data preparation can include generation of an individual satisfaction estimator and a couple satisfaction estimator.

The individual satisfaction estimator and a couple satisfaction estimator are used to match people. A user of the matching service completes a survey to provide data to the matching service. The user's data is compared to an individual satisfaction estimator to approximate the satisfaction the user has in his/her relationships with others. Candidates for matching with the user are identified based on the results. For instance, the candidates have results which are similar to the user to reduce matches between people who are likely to have conflicting relationships.

One of the identified candidates is then selected. Data for the user and data for the selected candidate is compared to approximate the satisfaction that the user would have in a relationship with the candidate. This is repeated for each of the identified candidates. The results are studied to identify the candidate and user combinations that would result in the most satisfaction. The user and the identified candidates are then given the option of communicating with one another.

As described above, the approximate individual satisfaction index and the couple satisfaction index are generated from empirical data. The empirical data is generated from surveys completed by different individuals. Each survey includes a plurality of inquiries into matters which are relevant to each individual in forming relationships with other people. The inquiries can have numerical answers. These answers are used in a factor analysis to identify factors that are each a function of one or more correlated inquiries. These factors are used in the generation of the individual satisfaction estimator and the couple satisfaction estimator. Because the factors are a function of several inquiries, the use of the factors reduces the number of variables considered when generating the approximate individual satisfaction index and the couple satisfaction index. However, the complexity of the relationships between the variables (question answers) is retained in the results because each of the variables are taken into consideration when generating the factors.

In one embodiment of the invention, a matching service uses the methods taught in this specification to train a neural network. Training the neural network allows the matching service to take advantage of a neural network's ability to resolve problems in the presence of noisy and complex data. Additionally, the matching service can take advantage of the neural network to learn to improve the quality of the matching results.

FIG. 1 illustrates an embodiment of a system 10 for matching people who are interested in establishing a relationship with other people. The system 10 includes a network 12 providing communication between a matching service 14 and one or more remote units 16. The matching service 14 can include one or more processing units for communicating with the remote units 16. The processing units include electronics for performing the methods and functions described in this application. In one embodiment, the processing units include a neural network. Suitable remote units 16 include, but are not limited to, desktop personal computer, workstation, telephone, cellular telephone, personal digital assistant (PDA), laptop, or any other device capable of interfacing with a communications network. Suitable networks 12 for communication between the server and the remote units 16 include, but are not limited to, the Internet, an intranet, an extranet, a virtual private network (VPN) and non-TCP/IP based networks 12.

A user of a remote unit 16 and the matching service 14 can communicate as shown by the arrow labeled A. Examples of communications include exchange of electronic mail, web pages and answers to inquiries on web pages. The user of the remote unit 16 can also communicate with the user of another remote unit 16 as indicated by the arrow labeled B. The matching service provides the communication by receiving the communication from one user and providing the communication to another user. The matching service 14 can modify the communication from one user to another user. For instance, the matching service 14 can change the user's real name on an e-mail to a username so the sending user's identity is protected. The username can be assigned by the matching service 14 when the user signs up for the service or can be selected by the user when the user signs up for the matching service 14. One user can also communicate directly with another user as shown by the arrow labeled C. This direct communication can occur after the users exchange e-mail addresses or phone numbers during a communication through the matching service 14. Alternatively, one user can request that the matching service 14 provide another user with his/her direct communication information, i.e. e-mail address. The methods described in the present invention can be performed using only the communications illustrated by the arrows labeled A, B and C. However, other forms of communication can be used including normal mail services, phone calls and directly visiting the matching service.

The matching service 14 employs a data preparation stage, a matching stage and a communications stage. During the data preparation stage, empirical data is manipulated in preparation for the matching stage. The empirical data is used to match one or more candidates with a user in the matching stage. At the communication stage, communication is achieved between the user and one or more of the users. The communication can occur in one or more communication stages which are selected by the user and the candidate.

The matching service 14 employs empirical data during the data preparation stage. The empirical data is generated from answers to surveys such as the survey 20 illustrated in FIG. 2. The survey 20 asks a series of inquiries 22 that can be numerically answered. For instance, the inquiry "Do you like to go camping" is followed by a series of numbers arranged in a scale. The user provides an answer somewhere along the scale based on their preference for the activity. For instance, a "1" can indicate that the user enjoys camping while a "5" indicates that the user does not enjoy camping. Because the answer to each question varies from user to user, each inquiry and the associated answers are often referred to as variables.

Surveys 20 can be completed for the purpose of generating enough data for the matching service to make reliable matches. For instance, a large number of persons can be enlisted to fill out the surveys 20. These answers can then be used to construct an empirical database that can be used in the method of matching persons. However, these people who fill out these surveys need not become candidates for the service to match with others. As will become more apparent from the following discussion, the empirical database preferably should include data from both members of existing couples or previously existing couples. As a result, people selected to fill out surveys for the purpose of building an empirical database may be couples and may even be married.

The survey 20 can also be completed by means of a remote unit 16 with access to the matching service 14. The survey can be made available to the user in the form of one or more web pages after the user has registered for use of the matching service. After submitting the completed survey to the matching service, the user can request a list of potentially matching candidates from the matching service. The user can also request to become a candidate for matches with other users. In either case, the survey answers provided by the user are stored in the empirical database.

The survey and/or the registration process can also request that the user submit preliminary information. Preliminary information is information that is provided to a user and a candidate to help them determine whether they would like to initiate communication with the other party. The information which is provided can be entirely up to the user although the matching service can make suggestions about information which has been successful at eliciting responses. The preliminary information can include the user's appearance, interests, height, weight, location, age, picture, religion, business, etc. The user can also have the option of writing a short blurb about himself/herself.

The survey and/or the registration process can also request information to define people that would be candidates for the user. For instance, whether the user is seeking individuals of a specific religious group, ethnic background or sexual orientation.

The survey 20 need not be constant and can change with time. For instance, as the matching service 14 finds that certain inquiries 22 are less effective at revealing relationship satisfaction, these inquiries 22 can be dropped from the survey 20. Additionally, the matching service can add new questions to the survey to find out whether the new questions add incite into relationship satisfaction.

Figures 2, 3:
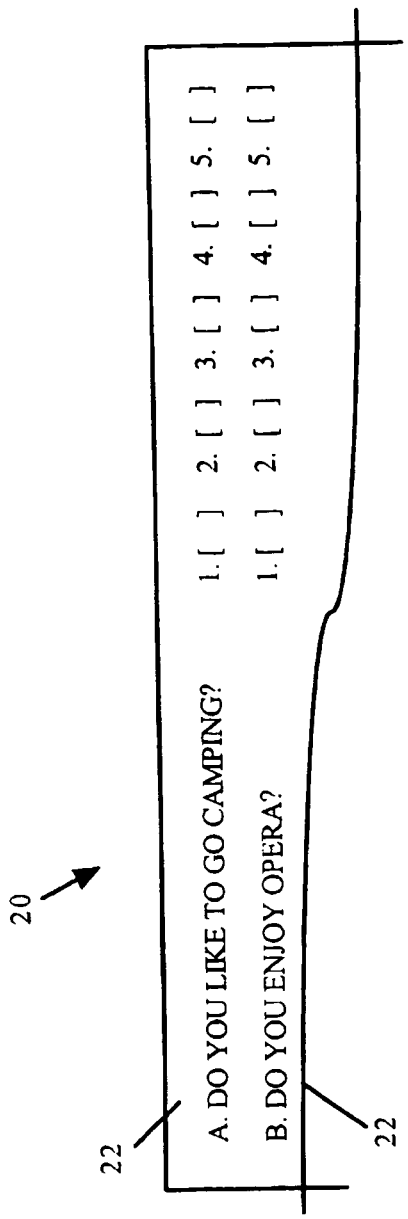
FIG. 2 illustrates an example of a survey that is answered by numerous individuals.
FIG. 3 illustrates the structure and contents of an empirical database generated from the answers to the survey illustrated in FIG. 2.

As described above, the answers to the survey 20 are used to generate an empirical database. FIG. 3 is an example of an empirical database 24. The empirical database 24 includes a column of identifier fields 26 that each identify a person who filled out the survey 20. Example identifiers include a person's name or other symbol associated with a particular person. The empirical database 24 also includes a plurality of variable columns 28. Each variable column 28 is marked by a particular letter that is associated with one of the inquiries 22 discussed above. Each field in a variable column 28 indicates a particular person's answer to a inquiry in the survey 20. Fields in the empirical database 24 can also be empty as results when certain inquiries 22 are dropped or added to the survey 20. Empty fields can also result when a user chooses not to answer one or more of the inquiries 22.

Figure 4:
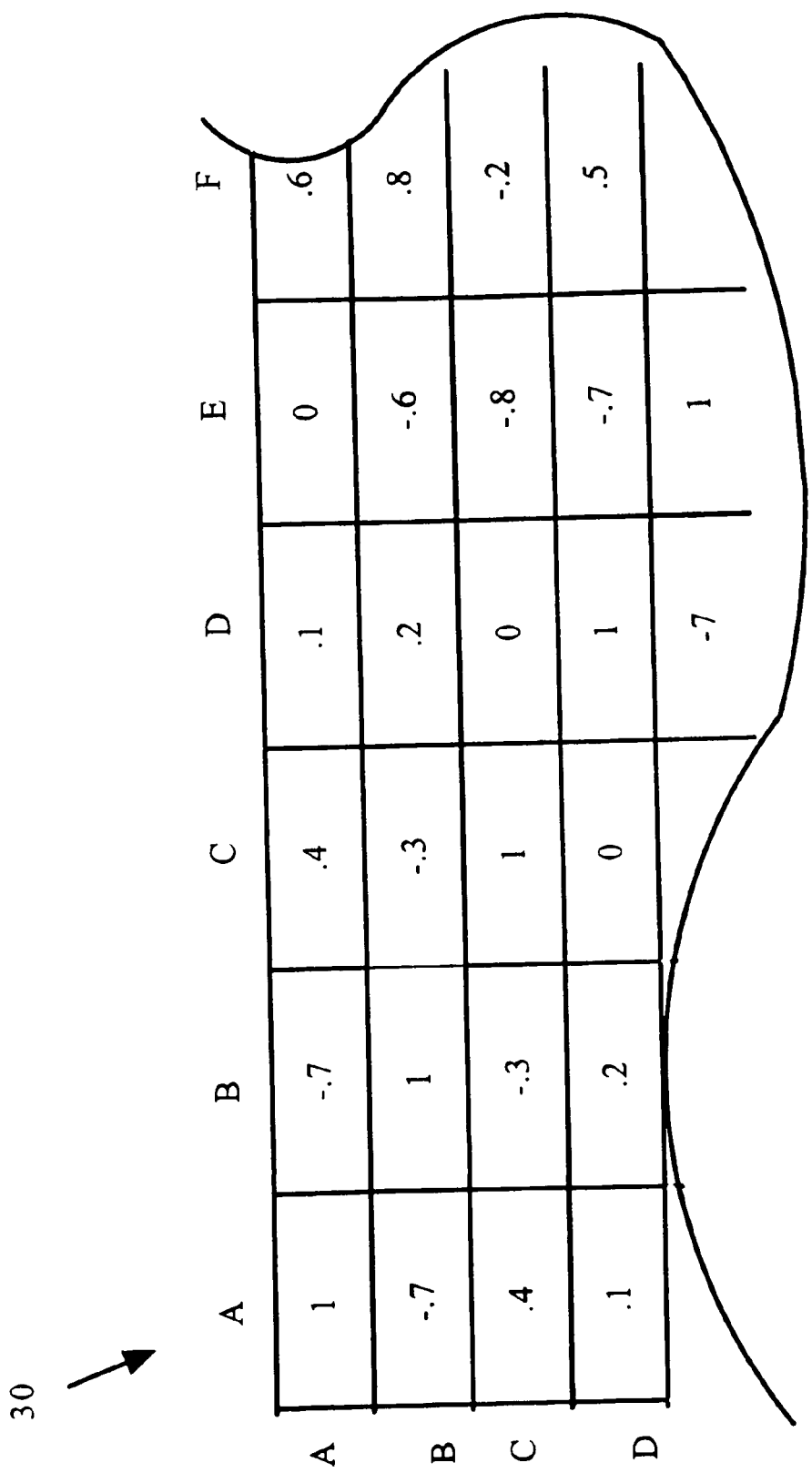
FIG. 4 is an example of a correlation matrix that shows the degrees of correlation between entries in the empirical database.

A correlation matrix 30 is constructed from the empirical database 24 in order to illustrate the degree of correlation between the variables of the empirical database 24. An example of a correlation matrix 30 is illustrated in FIG. 4. Each field of the correlation matrix 30 shows the degree of correlation between two of the variables. The degree of correlation can vary from negative one to positive one. A value of one indicates a high degree of correlation between the two variables. As a result, the correlation between variable A and itself is 1. The correlation matrix 30 is constructed from the empirical database 24. A suitable program for generating the correlation matrix 30 is STATISTICA from Statsoft, Inc. of Tulsa Okla. The variables used to construct the correlation matrix 30 are selected from the variables in the empirical database 24 by the matching service 14. As a result, variables that are less relevant to the satisfaction of a couple can be removed from the correlation matrix 30.

Figures 5, 6:
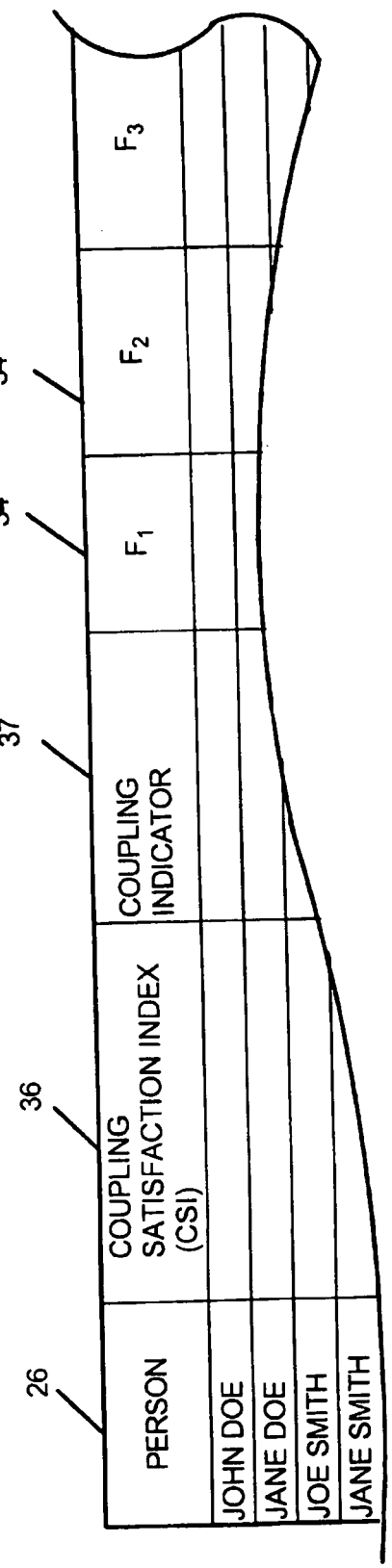
FIG. 5 illustrates factors as a function of the answers to one or more inquiries on a survey.
FIG. 6 illustrates the structure and contents of a factor value database that lists the value of the factors for particular people.

The correlation matrix 30 is examined to identify combinations of correlated variables that are commonly called factors. The factors are identified in a statistical process known as factor analysis. Factor analysis is a method of combining multiple variables into a single factor in order to reduce the total number of variables that must be considered. Hence, each factor is a function of one or more variables as illustrated in FIG. 5. For instance, the factors can be a weighted linear combination of two or more variables. The factor analysis is preferably performed to identify the minimum number of factors which are need to account for the maximum percentage of the total variance present in the original set of variables. A suitable factor analysis includes, but is not limited to, a principle component analysis with an eigenvalues greater than or equal to 1 criteria and a rotational procedure that is the biquartimax solution.

The factors are then used to generate a factor value database 32 such as the database illustrated in FIG. 6. The factor value database 32 can include a column of identifier fields 26 and several columns of factor fields 34. Each field in a column of factor fields 34 lists the value of a factor for a particular person. The people listed in the factor value database can include different people than the empirical database. For instance, as data in the empirical database becomes outdated it can be dropped from the factor value database.

The factor value database 32 also includes a column of individual satisfaction index fields 36. The individual satisfaction index indicates the level of satisfaction that a particular person who is a part of a couple has in that relationship. A suitable individual satisfaction index is the Dyadic Adjustment Scale (DAS). The DAS is a validated tool for assessing the level of satisfaction of a married person in that person's marriage. The DAS for a particular person can be generated from answers to inquiries 22 that are included in the survey 20 discussed with respect to FIG. 1. Because the DAS can be determined for existing couples, the DAS is a useful individual satisfaction index for developing the data needed by the matching service 14 prior to the time the matching service has enough users to generate statistics concerning the quality of matches that were made by the matching service. Other individual satisfaction indexes can be generated for use with the present invention.

An individual satisfaction index can be generated from couples that are matched by the matching service 14. For instance, each matched couple could be sent surveys 20 at various times after the match in order to determine each person's level of satisfaction with the coupling. The answers to these surveys 20 could then be used to determine an individual satisfaction index. A coupling index based on results of matching services 14 matches provides feedback concerning match results. Updating the methods of the present invention with this feedback allows the matching service to "learn" by taking into account the results of previous matches when making future matches. Other coupling indexes can also be constructed for use with the methods of the present invention.

Individual satisfaction indexes determined by different methods can be scaled so they can be compared. Accordingly, an individual satisfaction index generated from matching results can be compared with a DAS. Accordingly, the matching service 14 can convert a DAS based individual satisfaction index to an individual satisfaction index derived from matching results.

The factor value database 32 is used to approximate relationships between the individual satisfaction index and one or more of the factors. This relationship is called an individual satisfaction estimator because the relationship can be used to approximate an individual satisfaction index for an individual as will be described in more detail below.

An individual satisfaction estimator can be determined for each match group. A match group is a group of persons who may have different factors influence their satisfaction in a relationship. For instance, suitable match groups may include straight men, straight women, gay men and gay women. A relationship for a particular match group is generated using only data for members of the particular match group.

A suitable method for approximating a relationship between the individual satisfaction index and one or more of the factors includes, but is not limited to, performing a multiple linear regression and correlation analysis on the individual satisfaction indexes versus the factor data. Software for performing the multiple linear regression and correlation analysis is available from STATISTICA from Statsoft, Inc. of Tulsa Okla. The linear regression is preferably a step-wise linear regression.

Multiple linear regression and correlation analysis is a preferred method for approximating the relationship because the differential factors that are minimally correlated to the couple satisfaction index can be removed from the relationship. Accordingly, the number of factors included in the relationship are reduced. The factors included in the relationship are called selected satisfaction factors below.

Figure 7:
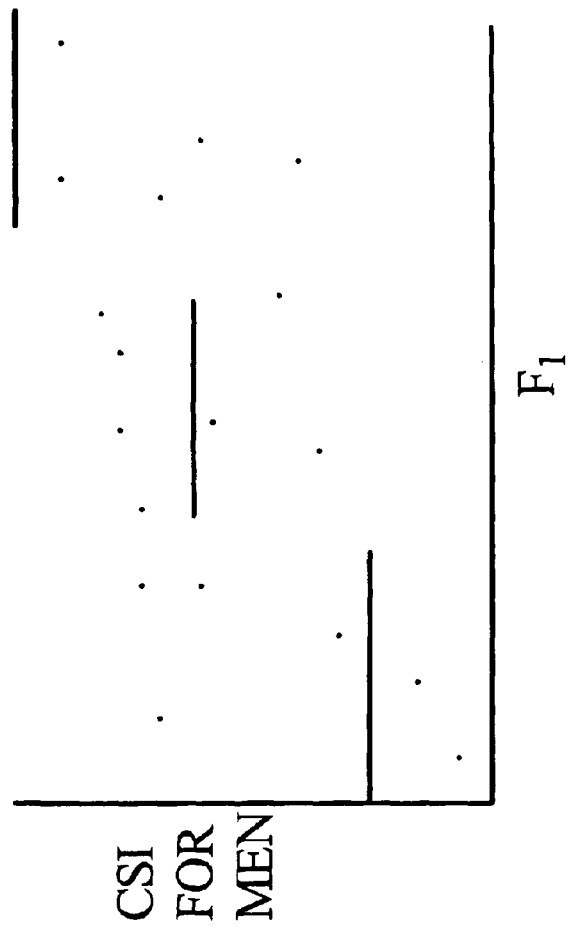
FIG. 7 illustrates a linear regression performed on individual satisfaction index data plotted versus the value of a particular factor for the men listed in the factor value database.

FIG. 7 illustrates an example of generating a relationship between the individual satisfaction index and one of the factors. For the purposes of illustration, the example is highly simplified to include a single factor. The individual satisfaction indexes for men are plotted versus the value of a factor labeled $F_1$. The results of a step-wise linear regression performed on the plotted data is illustrated. These results are the approximated relationship between the individual satisfaction index and the factor value.

Equation 1 is an example of an individual satisfaction estimator generated using a multiple linear regression and correlation analysis. Each of the selected satisfaction factors is assigned a weight according to the degree of correlation between the value of the factor and the individual satisfaction index. The higher the degree of correlation associated with a particular factor, the higher the weight assigned to that factor. The selected satisfaction factors are combined as shown in Equation 1 where C is the approximated individual satisfaction index, $F_i$ is a selected satisfaction factor i and $w_i$ is the weight assigned to $F_i$.

$$C = \Sigma w_i F_i \quad \text{Equation 1}$$

As described above, the individual satisfaction estimator can be used to determine an approximate individual satisfaction index for an individual. The approximate individual satisfaction index is determined by comparing the individual's survey answers to the individual satisfaction estimator. For instance, the individual's answers can be used to calculate each of the selected satisfaction factors in Equation 1. Each of the calculated factors is substituted into Equation 1 along with the appropriate weights to determine the approximated individual satisfaction index, C. As described above, the individual satisfaction index is an indication of how satisfied an individual is in a relationship. Accordingly, the approximated individual satisfaction index, C, that is determined for a person provides an indication of how satisfied that person will be in the relationships that person forms with others.

The approximate individual satisfaction index can be used to classify individuals. For instance, individuals may be placed in an unlikely men classification, an unlikely women classification, an average men classification, an average woman classification, a good men classification or a good woman classification. The unlikely classification may indicate that the user is unlikely to be happy in any relationship. The average classification indicates that the user has an average chance of forming satisfactory relationships and the good classification indicates that the user has an above average chance of forming satisfactory relationships. The classes can be broken down further to include personal information such as sexual orientation. The user can be placed in a particular classification based on whether his individual satisfaction index falls within a particular range associated with the classification. For instance, a man with low individual satisfaction indexes can be placed in the unlikely men classification and a woman with a high individual satisfaction index can be placed in a good woman classification. The matching service may choose not to provide service to people who fall within particular classifications. For instance, the matching service may choose not to match people who fall within the unlikely classification.

Figure 8:
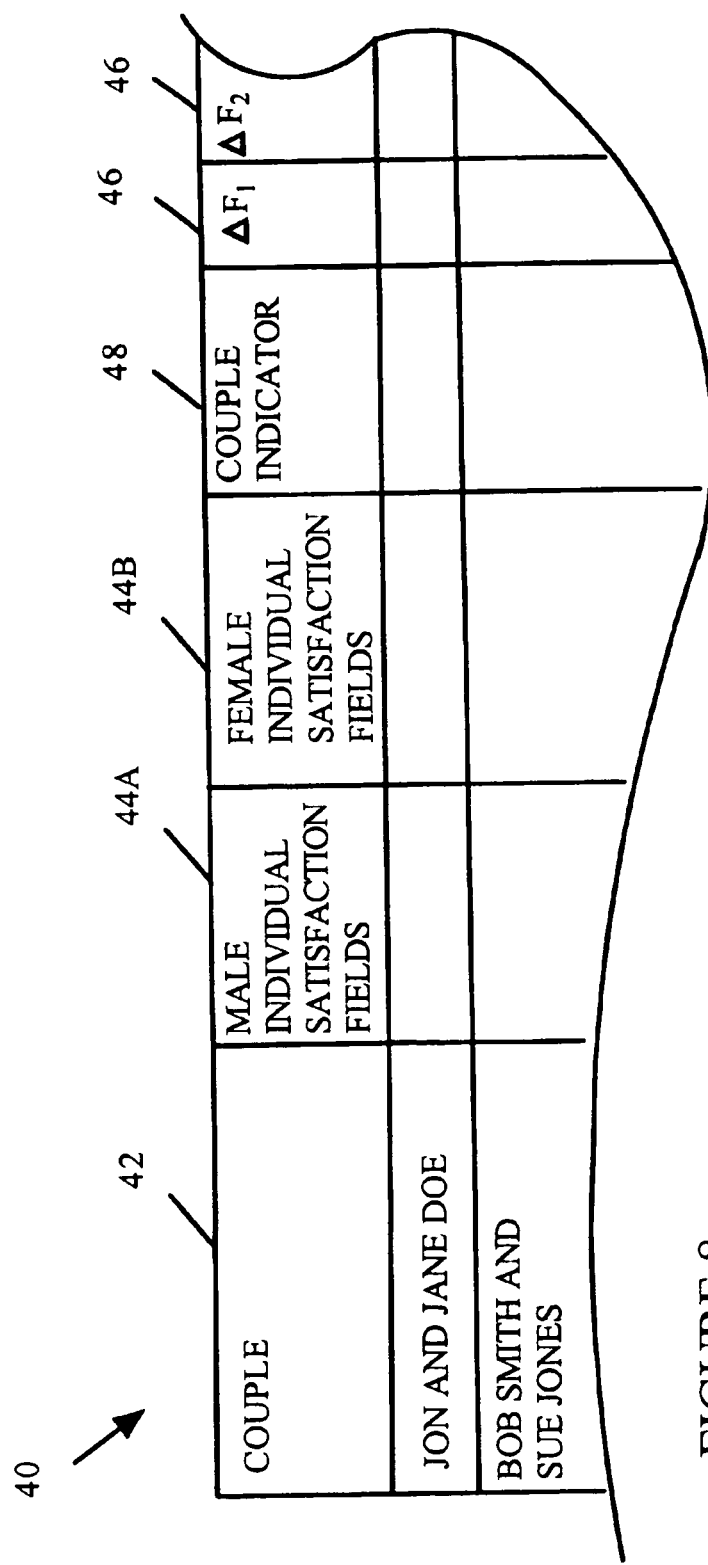
FIG. 8 illustrates an example of a couple database which lists the difference in the value of particular factors between the members of a couple.

A couple database 40 can also be generated from the factor value database 32. FIG. 8 illustrates an example of a couple database 40. The couple database 40 includes a column of couple identifier fields 42, a column of male individual satisfaction index fields 44A, a column of female individual satisfaction index fields 44B and several columns of differential factor fields. The fields in the column of male satisfaction indexes list the individual satisfaction index for the male of each couple and the fields in the column of female satisfaction indexes list the individual satisfaction index for the female of each couple. Although these column descriptions assume the couples include a male and female method, the couple database can be easily adapted to include couples of a single sex. The fields in the columns of differential factor fields list the difference between the value of a factor for the couple. For instance, the fields in the column of differential factor fields 46 labeled $\Delta F_1$ can the list difference between the value of $F_1$ for the female of a couple and the value of $F_1$ for the male of the couple.

The couple database 40 can be used to approximate relationships between the individual satisfaction index and one or more of the differential factors. This relationship is called a couple satisfaction estimator because it can be used to approximate the satisfaction that a person would have in a relationship with a particular person. A couple satisfaction estimator can be determined for each class that people are placed into based on their individual satisfaction index or their approximate individual satisfaction index. A couple satisfaction estimator for a particular class is generated using only data for members of the class. The matching service may have a class for people that the matching service does not wish to match. Because people falling within this class will not be matched, a couple satisfaction estimator does not need to be generated for this class.

A suitable method for approximating a relationship between the individual satisfaction index and the one or more of the differential factors includes, but is not limited to, performing a multiple linear regression and correlation analysis on the individual satisfaction index versus the differential factor data. Software for performing the multiple linear regression and correlation analysis is available from STATISTICA from Statsoft, Inc. of Tulsa Okla. The linear regression is preferably a step-wise linear regression.

Multiple linear regression and correlation analysis is a preferred method for approximating the relationship because the differential factors that are minimally correlated to the couple satisfaction index can be removed from the relationship. Accordingly, the number of differential factors included in the relationship can be reduced. The factors included in the relationship are called selected differential factors below.

Figure 9:
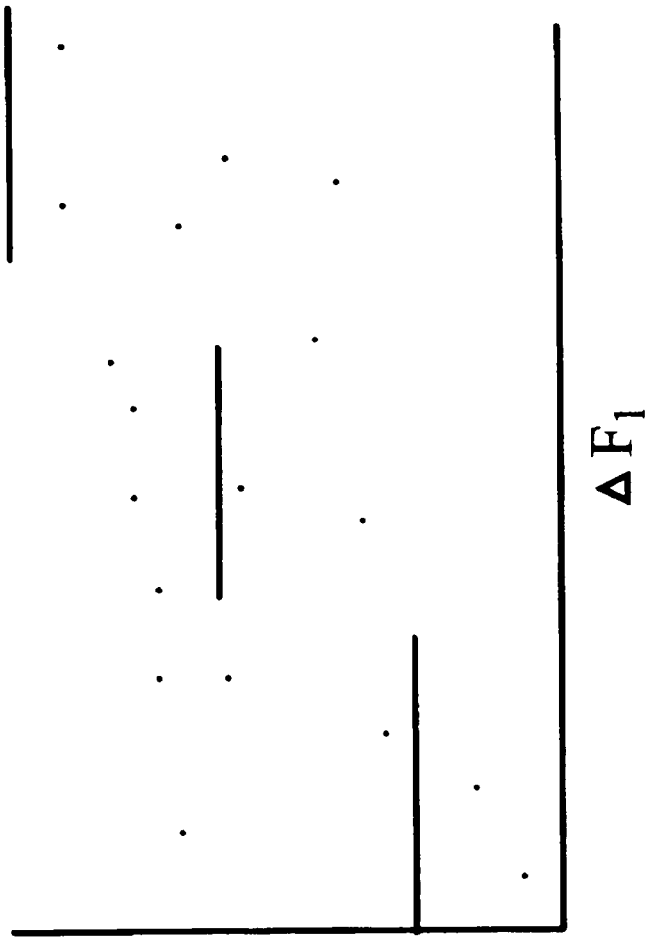
FIG. 9 illustrates an individual satisfaction index plotted versus the value of the differential factor labeled $\Delta F_1$

FIG. 9 illustrates an example of generating a relationship between the individual satisfaction index and one of the differential factors. For the purposes of illustration, the example is highly simplified to include a single differential factor. The individual satisfaction indexes for men in the average classification are plotted versus the value of a differential factor labeled $\Delta F_1$. The results of a step-wise linear regression performed on the plotted data is illustrated. These results are the approximated relationship between the individual satisfaction index and the differential factor value for men in the average class.

Equation 2 is an example of a couple satisfaction estimator generated using a multiple linear regression and correlation analysis. Each of the selected differential factors is assigned a weight according to the degree of correlation between the value of the differential factor and the individual satisfaction index. The higher the degree of correlation associated with a particular differential factor, the higher the weight assigned to that differential factor. The selected differential factors are combined as shown in Equation 2 where CI is the approximate couple satisfaction index, $F_i$ is a selected satisfaction factor i and $w_i$ is the weight assigned to $F_i$.

$$CI = \Sigma w_i \Delta F_i \qquad \text{Equation 2}$$

As described above, the couple satisfaction estimator can be used to determine an approximate couple satisfaction index for a couple. The approximate couple satisfaction index is determined by comparing the couple's survey answers to the couple satisfaction estimator. For instance, the couple's answers can be used to calculate each of the selected differential factors in Equation 2. Each of these differential factors is substituted into Equation 2 along with the appropriate weights to determine the approximate couple satisfaction index, CI. The approximate couple satisfaction index is an approximate value of the satisfaction index that a particular person would have in a relationship with another person.

During the matching stage, the matching system 10 matches a user operating a remote unit 16 with one or more candidates. The user fills out a survey 20 at the remote unit 16. In one embodiment, the survey 20 includes only the variables needed to calculate each of the selected factors and the selected differential factors. In another embodiment, the survey 20 includes the variables needed to calculate each of the factors identified during the factor analysis. In yet another embodiment, the survey 20 includes more variables than are needed to calculate the factors identified during the factor analysis.

The matching service 14 receives the survey 20 filled out by the user and the user's match group is identified. The individual satisfaction estimator associated with the identified match group is identified. The user's answers to the inquiries 22 are compared to the identified individual satisfaction estimator to determine an approximate individual satisfaction index for the user.

The user is then placed in a class based on the user's approximate individual satisfaction index. As described above, users may be placed in an unlikely men or women classification, an average men or women classification or a good men or women classification.

The matching service 14 then selects candidates to be matched with the user. The selected candidates fall within either the same or similar class as the user. Alternatively, the candidates fall within a class that is similar to the user but includes members of the opposite sex. For instance, if the user is heterosexual and fits within the good men classification, the candidates fall within the good women classification.

The matching service identifies the couple satisfaction estimator associated with the user's classification and one of the identified candidates is selected. The user's answers to the inquiries 22 and the selected candidate's answers to the questions are compared to the identified couple satisfaction estimator to determine an approximate couple satisfaction index for the user and the selected candidate. As discussed above, the approximate couple satisfaction index approximates the satisfaction that the user will have in a relationship with the selected candidate. An approximate couple satisfaction index is generated for each identified candidate.

The matching service uses the approximate couple satisfaction index to identify potential matches for the user. For instance, the matching service can select candidates who result in a couple satisfaction index over a particular threshold as potential matches. Alternatively, some pre-determined number of candidates resulting in the highest couple satisfaction indexes are identified as potential match candidates.

Additionally, the matching service can use a criteria based on determining a couple satisfaction index for both and a couple satisfaction index for the candidate for each user and candidate combination. For instance, for each combination of a user and a candidate, the matching service can identify the couple satisfaction predictor associated with the class of the user and the couple satisfaction predictor associate with the class of the candidate. The survey answers for the user and the candidate can be compared to the couple satisfaction predictor associated with the class of the user to generate an approximate couple satisfaction index for the user. The survey answers for the user and the candidate can also be compared to the couple satisfaction predictor associated with the class of the candidate to generate an approximate couple satisfaction index for the candidate. Accordingly, the matching service will have approximated the user's satisfaction in a relationship with a candidate and the candidate's satisfaction in a relationship with a user. The matching service can combine these results to select the matches for the user. For instance, the approximate couple satisfaction index for the candidate and the user can be added together and the candidates that provide the highest total will be selected as a potential match. Other combinations of the approximate couple satisfaction index for the candidate and the user can be used to select the potential matches. For instance, the approximate couple satisfaction index for the candidate and the user can be averaged and the difference between the approximate couple satisfaction index for the candidate and the user can also be determined. The candidates that yield the high averages and low differences can be selected as the potential matches.

During the communication stage, the matching service 14 provides preliminary information for each of the potential match candidates to the user. The matching service 14 can also provide the user with several communication levels from which to choose. Alternatively, the matching service can arrange the communication levels in a particular sequence and require that the user and the candidate being in a particular communication level.

Each of the communication levels allows the parties to exchange information in a different format. Examples of exchanging information at different communication levels include exchanging answers to open-ended questions provided by the matching service, exchanging items selected from a list provided by the matching service, exchanging answers to open-ended questions provided by the matching service and exchanging questions and answers written by the user and/or the candidate.

The communication levels can be arranged in a preferred communication level sequence. For instance, the communication levels can be sequenced so a user and a candidate proceed through the communication levels so they are able to exchange increasingly personal information. Once the matching service has settled on a particular sequence, the matching service may require that a user and a candidate progress through the communication levels in sequence. However, the matching service can provide the user and a candidate with the option of choosing when to progress to the next communication level.

One embodiment of the matching service 14 allows the user and candidate to select which communication levels they use to communicate. As a result, the user and candidate select the level on which they are most comfortable communicating and can move forward with forming a relationship by proceeding to a communication level that allows for the exchange of more personal information. Alternatively, a user and candidate can back off of a relationship by proceeding to a communication level that allows for a less personal exchange of information.

When the user and the candidate use the communication service to exchange information they communicate the information to the matching service 14 which then forwards the information to its destination. The matching service 14 can perform this exchange by forwarding an email from one user to another user. The matching service 14 can replace each users email address with the user's username before forwarding the e-mail. As a result, the address of the sender remains confidential and is not available to the ultimate recipient. Accordingly, information exchanged through the matching service 14 is confidential. Additionally, the matching service 14 can hold information that it receives from the user until it has received a response from the candidate or vice versa. As a result, one person can not get the information from another person without making an even exchange.

The matching service 14 can facilitate an exchange of closed-ended questions 22 by providing the user and the candidate with a list of closed-ended questions 22. An example of a closed-ended question includes the following.

If you were taken by your date to a party where you knew no one, how would you respond?

a) Stay close to my date, letting he/she introduce me.
   b) Find a spot at the back bar and relax alone.
   c) Strike out on my own and make friends.
   d) Ask if I could skip the event.

The user's answers are provided to the candidate and the candidate's answers are provided to the user.

The matching service 14 can facilitate an exchange of lists by providing both the user and the candidate with the same or similar lists. The user and candidate can be directed to select whatever they want from the list or to select a pre-determined number of items from the list. For instance, the user and the candidate can be directed to select 10 items from the following list. The lists can be directed toward particular subjects including, but not limited to, relationship issues, religious issues, entertainment items, money and food. In one embodiment, the user and/or the candidate can select the subject matter for the list. In another embodiment, the user and the candidate must agree on the subject matter of the lists.

Examples of lists include, but are not limited to, a list of "must haves" and/or a list of "can't stands." Examples of must haves directed toward relationship issues include the following.

I must feel deeply in love and attracted my partner.
I must have someone who is good at talking and listening.
I must have someone who is sharp and will keep me on my toes.

Examples of can't stands directed toward relationship issues include the following.

I can't stand someone who is belittling or hateful to people.
I can't stand someone who has a chip on their shoulder.
I can't stand someone who sees material items as a matter of satisfaction.

The user's selections from the list are provided to the candidate and the candidate's selections from the list are provided to the user. Only the items selected from the list can be provided to the other party or the entire list with the selected items marked can be provided to the other party.

The matching service 14 can facilitate an exchange of one or more open-ended questions 22 by providing both the user and the candidate with the same or similar open inquiries 22. The open-ended questions 22 can be directed toward particular subjects including, but not limited to, relationship issues, religious issues, entertainment items, money and food. In one embodiment, the user and/or the candidate can select the subject matter for the open-ended questions 22. In another embodiment, the user and the candidate must agree on the subject matter of the open-ended questions 22.

Examples of open-ended questions 22 directed toward relationship issues include the following.

Besides love, what one trait have you noticed in couples that have maintained a successful relationship for many years?

Looking back on your life of what are you most proud?

The user's answers are provided to the candidate and the candidate's answers are provided to the user.

In another communication level, the matching service 14 facilitates an exchange of inquiries 22 written by the user and/or by the candidate. As described above, the inquiries 22 are forded between the parties through the matching service 14. Accordingly, the matching service 14 can retain confidentiality by removing personal information from an e-mail. For instance, the matching service 14 can replace an e-mail address with a persons user name. Although these inquiries 22 are written by the user and/or the candidate, the matching service 14 can provide lists of examples for guidance. For instance, the matching service 14 can provide a list of inquiries 22 including the following inquiries 22.

What person in your life has been most inspirational and why?

Tell me about your closest friend. How long have you known them; and what do like best about them?

The user's answers are provided to the candidate and the candidate's answers are provided to the user.

Because this communication level allows communication between the user and the candidate with the matching service 14 serving as an intermediary that preserves confidentiality, the user and the candidate can use this communication stage to communicate as would be done in direct e-mail communications. Hence, a user and candidate in this communication stage need not stay exchanging inquiries 22. For instance, the user and the candidate can exchange their e-mail addresses, phone numbers and/or set up a time to meet elsewhere.

In another communication level, the matching service 14 facilitates open communication between the user and/or by the candidate. For instance, the user can request that the matching service 14 make his/her contact information available to the candidate and/or the candidate can request that the matching service 14 make his/her contact information available to the user. Suitable contact information includes, but is not limited to, e-mail addresses, phone numbers and street addresses.

Figure 10:
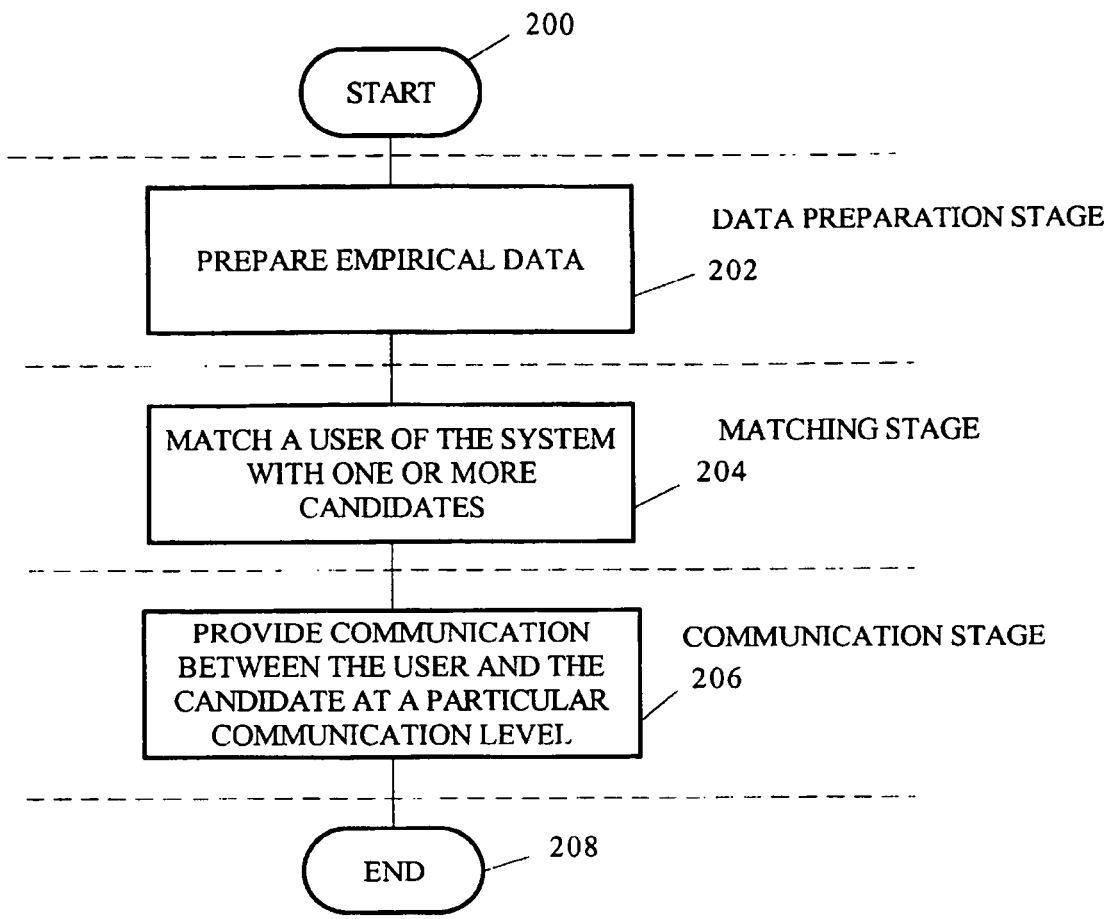
FIG. 10 illustrates the invention embodied as a method of operating a matching service.
Figure 12:
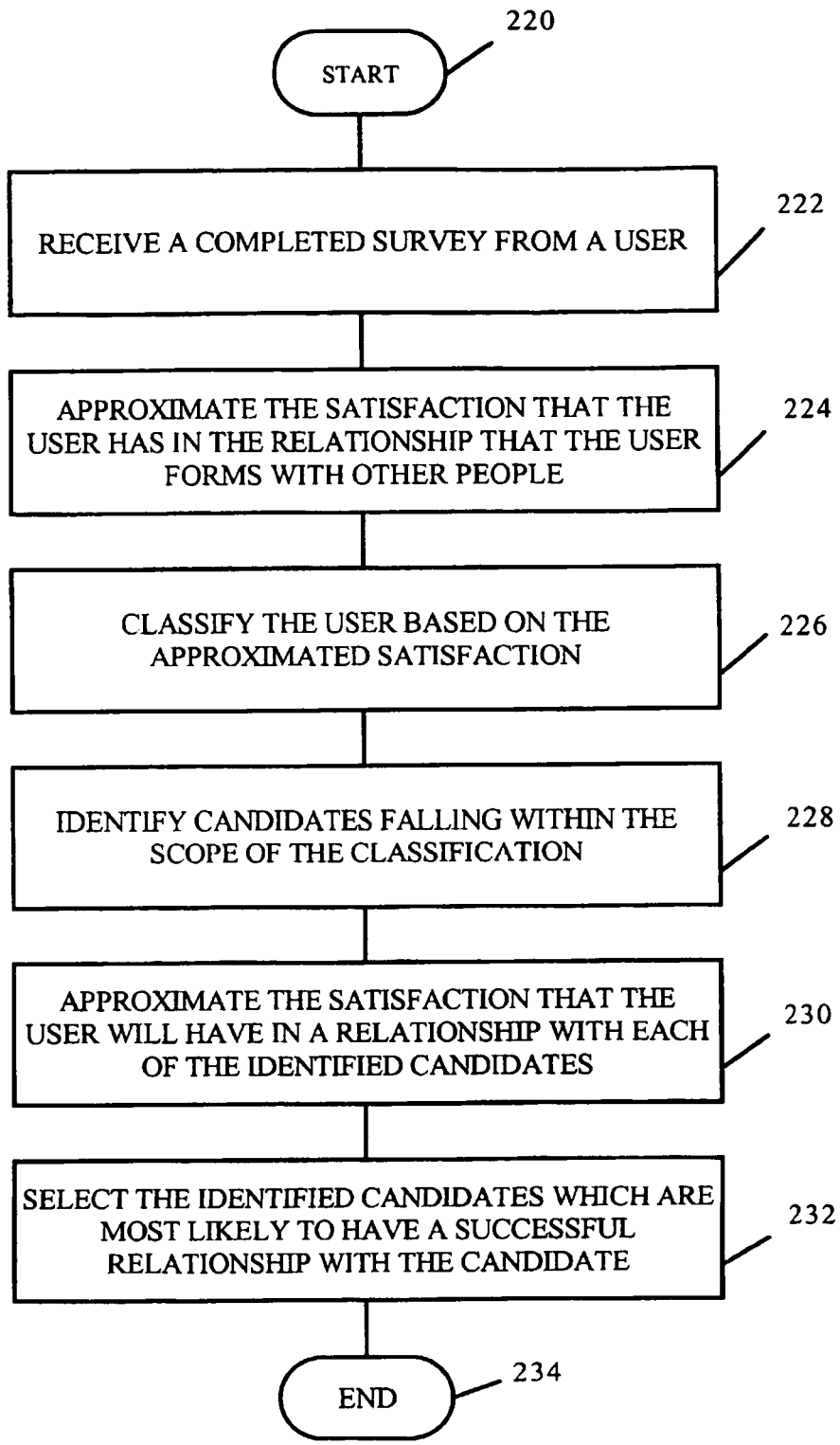
FIG. 12 illustrates the invention embodied as a method for using the prepared empirical data to match a user of the matching service with one or more candidates.
Figure 13:
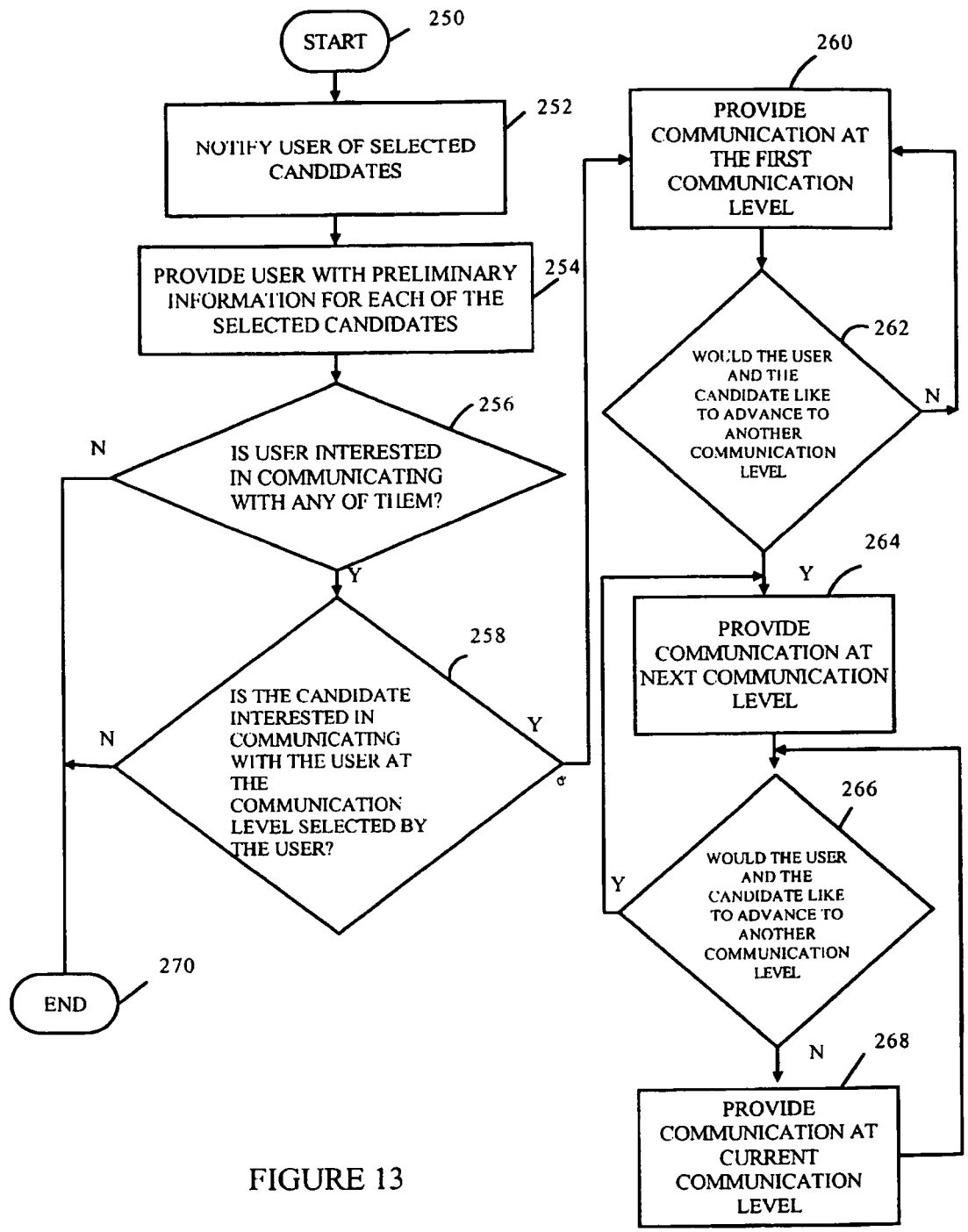
FIG. 13 illustrates the invention embodied as a method of providing communication between the user of the service and the one or more candidates.

FIG. 10 illustrates an embodiment of a method of operating a matching system 10. The method begins at start block 200. At process block 202, the matching service 14 prepares empirical data. An example of a method for preparing the empirical data is illustrated in FIG. 12. At process block 204, the matching service 14 uses the prepared empirical data to match a user of the matching service 14 with one or more candidates selected from a pool of candidates. An example of a method for matching the user with one or more candidates is illustrated in FIG. 13. At process block 206, the matching service 14 provides communication between the user and the one or more selected candidates. FIG. 16 provides an example of a method of providing communication between the user and the one or more selected candidates. The method terminates at end block 208.

Figure 11:
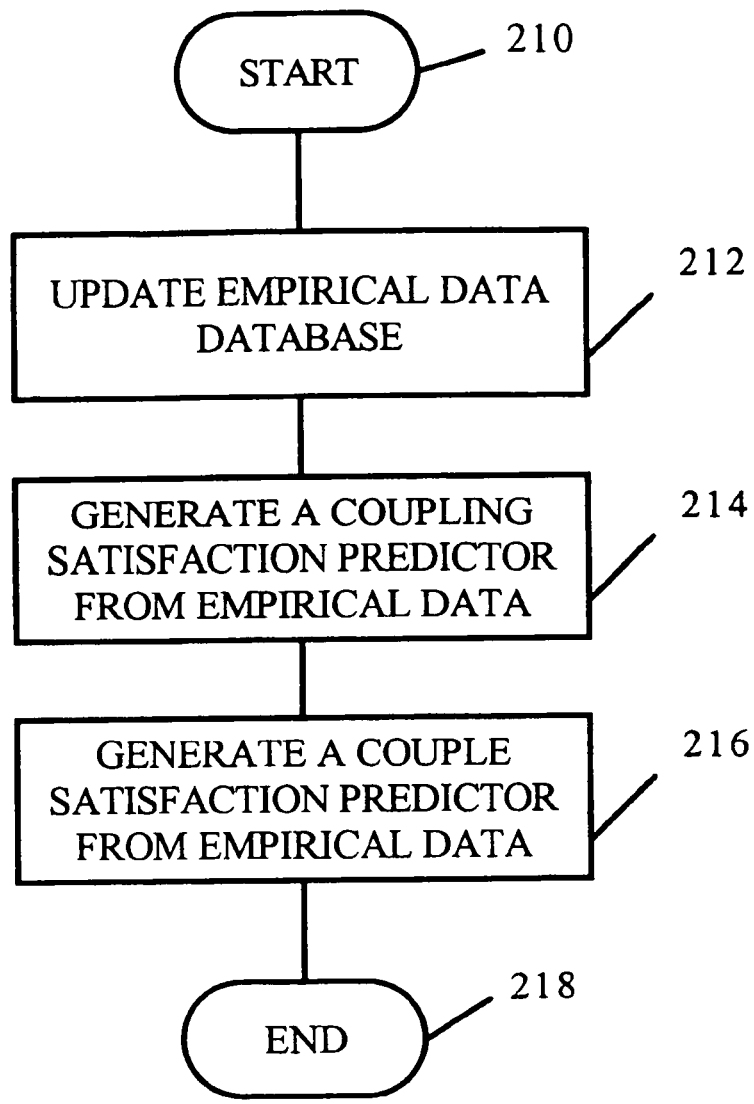
FIG. 11 illustrates the invention embodied as a method of preparing empirical data in preparation for matching a user with one or more candidates.

FIG. 11 illustrates an example of a method of preparing empirical data for matching a user with a candidate. The empirical data can be prepared before each user is to be matched with a candidate. Alternatively, the empirical data can be prepared periodically. For instance, the prepared empirical data can be used to match several users of the matching service 14 with candidates and then the empirical data can be prepared again.

The method of preparing the empirical data begins at start block 210. The method can be started in response to a user using a remote unit 16 to access the matching service 14, completing a survey 20 and requesting a list of potential matches. Alternatively, the method can be started in response to particular criteria such as passage of a particular amount of time or a particular number of users having been matched. At process block 212 the empirical database 24 is updated. This database can be updated to include information from a completed survey 20 submitted by a user who is requesting a list of potential matches. Updating the database can also include removal of information from the database. For instance, outdated information can be extracted. Additionally, information can be extracted in order or to convert the database from use of a DAS to an individual satisfaction index which is the result of matches resulting from the matching service 14. Other databases can be updated at this stage. For instance, data for generating an individual satisfaction index for each member of a couple that was matched by the matching service can be incorporated into the databases. The resulting individual satisfaction index can be listed in the factor value database.

At process block 214, the updated empirical database 24 is used to generate an individual satisfaction estimator. At process block 216, the updated empirical database 24 is used to generate a couple satisfaction estimator. The method terminates at end block 218.

FIG. 12 illustrates a method of matching a user of the system 10 with one or more candidates. The method starts at start block 220 when a user completes a survey 20 and requests a list of potentially matching candidates. At process block 222 the completed survey 20 is received from the user. The user preferably employs a remote unit 16 to transmit the survey 20 to the matching service 14 although the survey 20 can be mailed or completed in person at the matching service 14.

At process block 224, the satisfaction that the user has in relationships that the user forms with others is approximated. This approximation can be made by determining an approximate individual satisfaction index for the user. One method for determining the approximate individual satisfaction index includes identifying the match group to which the user belongs. The individual satisfaction estimator associated with the identified match group is then identified. The user's answers to at least a portion of the inquiries 22 on the survey 20 are compared to the identified individual satisfaction estimator. In one embodiment, comparing the user's answers to the identified individual satisfaction estimator includes calculating the value of the selected factors from the answers that the user provided and then comparing the calculated factors to the individual satisfaction estimator. At process block 226, the approximate individual satisfaction index is used to classify the user.

At process block 228, the candidates that fall within the classification of the user are identified. At process block 230, the satisfaction that the user would have in a relationship with each of the identified candidates is approximated. This approximation can made by determining an approximate couple satisfaction index for the user and a candidate. One method for determining the approximate couple satisfaction index includes comparing at least a portion of the answers provided by the user and the candidate to the couple satisfaction estimator. In one embodiment, comparing the answers provided by the user and the candidate to the couple satisfaction estimator includes calculating the selected differential factors from the answers provided by the user and a candidate and comparing the selected differential factors to the couple satisfaction estimator.

At process block 232, the approximated satisfaction that the user would have in a relationship with each of the identified candidates are used to select the candidates for a potential match with the user. As described above, selecting the candidates can also include approximating the satisfaction that each candidate would have in a relationship with the user. The method then terminates at end block 234.

FIG. 13 illustrates a method of providing communication between the user and a candidate. As described above, one embodiment of the invention includes allowing the user and a candidate to select the communication level on which they will communicate while another embodiment of the invention requires the user and a candidate to progress through a sequence of communication levels. FIG. 13 illustrates providing communication between the user and a candidate when the matching service requires that the user and candidate proceed through a sequence of communication levels.

The method starts at start block 250. The user is notified of the selected candidates at process block 252. The preliminary information for each of the selected candidates is provided to the user are process block 254. At determination block 256, a determination is made whether the user wishes to communicate with any of the selected candidates. When the determination is positive, determination block 258 is accessed. At determination block 258, a determination is made whether the candidate is interested in communicating with the user. This determination can be made by providing a candidate with the user's preliminary information. The candidate can respond to the matching service 14 by indicating whether he/she would like to communicate with the user.

When it is determined that the candidate would like to communicate with the user at determination block 258, process block 262 is accessed. At process block 262, communication is provided between the user and a candidate at the first communication level of the sequence. As described above, providing communication can include forwarding communication from one party to another and/or forwarding questions, lists, data or other information from the matching service 14 to the user and/or the candidate.

At determination block 264, a determination is made whether the user and/or the candidate would like to proceed to another communication level. The matching service 14 can make this determination by transmitting a communication to one or both parties asking whether they would like to try a new communication level. One or both of the parties can be presented with this option after proceeding to a certain point in the current communication level. Alternatively, a communication being forwarded from one party to another can be modified to include the option of indicating a new communication level or the option can simply accompany the communication from one party to the other. When neither party indicates that they would like to communicate at the next communication level, the determination is negative and the method returns to process block 262.

When one or both parties indicate that they would like to try the next communication level, the determination at determination block 264 is positive and the method proceeds to process block 266. At process block 266, communication is provided between the user and a candidate at the next communication level of the sequence. At determination block 270 a determination is made whether the user and/or the candidate would like to proceed to another communication level. The matching service 14 can make this determination as described with respect to decision block 264. When the determination is positive, the method returns to process block 268. When the determination is negative, the method proceeds to process block 272 where the matching service continues to provide communication at the current communication level.

When the determination at determination block 256 or determination block 258 are negative, the method terminates at end block 268. Additionally, either party can indicate to the matching service 14 that they wish to terminate the communication at any time. When a party indicates that they wish to terminate the communication, the method ends at end block 270.

The methods described above with respect to the data preparation stage and/or the matching stage can be used to train a neural network. The neural network can be trained to receive data from a user's survey and to output a list of potentially matching candidates for that user. A suitable neural network includes, but is not limited to, a principal component analysis (PCA) neural network that includes a mixture of unsupervised and supervised. The unsupervised segment of the network can perform the factor analysis. A PCA neural network converges very rapidly and there are usually fewer factors extracted than there are inputs, so the unsupervised segment provides a means of data reduction.

Figure 14:
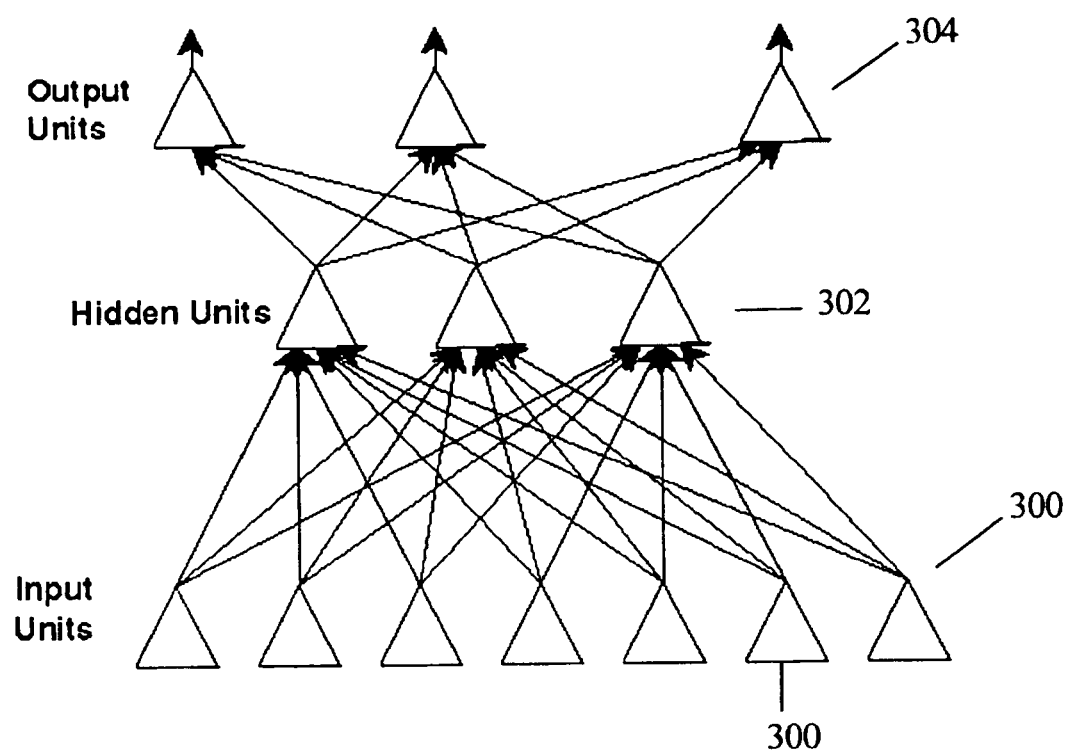
FIG. 14 illustrates a supervised backpropogated neural network.

A simplified example of a supervised backpropogated neural network is illustrated in FIG. 14. The supervised backpropogated neural network includes a plurality of input units 300 that are each in communication with a hidden unit 302. Each hidden unit 302 is in communication with an output unit 304. Although a (single layer of hidden units 302 is illustrated, the backpropogated neural network can include more than one layer of hidden units 302. The supervised backpropogated neural network can be trained to randomly determine parameter values and carry out input-to-output transformations for identifying matching candidates for a user.

The PCA data is applied to train the backpropogated neural network. In the supervised segment, the network performs the (linear or nonlinear) classification of the factors using a back propogation architecture that can randomly determine parameter values and carry out input-to-output transformations for actual problems. The correct final parameters are obtained by properly modifying the parameters in accordance with the errors that the network identifies in the process. The use of back propogation can include a delta rule network in which the one or more layers of hidden units 302 are added. The network topology can be constrained to be feed forward. For instance, the connections can be allowed from the input layer to the first hidden layer and from the first hidden layer to any subsequent hidden layers and then to the output layer. Multiple hidden layers can learn to recode the inputs to achieve the best estimation of output units 304.

The neural network can also include a Kohonen neural network so it can adapt in response to the inputs. The use of a Kohonen neural network allows for self-organizational mapping and competitive learning. In self-organizational mapping, the Kohonen neural network allows for the projection of multidimensional points onto two dimensional networks. In competitive learning, the Kohonen neural network finds a pattern of relationships that is most similar to the input pattern. This results in a Kohonen clustering algorithm that takes a high dimensional input and clusters it but retains some topological ordering of the output. This clustering and dimensionality reduction is very useful as a further processing stage in which further neural networking data processing can be accomplished and the identification of match candidates optimized.

Although the above description is largely directed toward matching people in couples, the methods can be easily adapted to include relationships with more than two people. Additionally, the methods can be adapted to match people for purposes other than romantic relationships. For instance, people who would be suitable for a business relationship can also be identified. Further, the methods need not be limited to people. For instance, the methods can be adapted for the matching of business establishments.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed:

1. A method of operating a matching service, comprising:
   using a processor to approximate a relationship satisfaction that a user of the matching service has in relationships that the user forms with others;
   using the processor to identify a plurality of candidates for a relationship with the user based on the approximated relationship satisfaction; and
   approximating a coupling satisfaction that the user will have in a relationship with each of the plurality of candidates.

2. The method of claim 1, wherein approximating the relationship satisfaction that a user of the matching service has in the relationships that the user forms with others includes generating an approximate individual satisfaction index for the user.

3. The method of claim 1, wherein approximating the relationship satisfaction that a user of the matching service has in the relationships that the user forms with others includes generating an individual satisfaction estimator.

4. The method of claim 3, wherein the individual satisfaction estimator includes a relationship between an individual satisfaction index and one or more questions answered by the user.

5. The method of claim 3, further comprising:
   receiving a survey from the user, the user having provided answers to a plurality of inquiries in the survey, at least a portion of the answers being associated with a number; and
   comparing answers provided by the user to an individual satisfaction estimator.

6. The method of claim 1, further comprising:
   classifying the user based on the approximated relationship satisfaction that the user has in the relationships that person forms with others; and
   identifying the candidates such that the candidates fall within the same class as the user.

7. The method of claim 1, wherein approximating the coupling satisfaction that the user will have in a relationship includes generating an approximate couple satisfaction index for the user and a particular candidate.

8. The method of claim 1, wherein approximating the coupling satisfaction that the user will have in a relationship includes generating a couple satisfaction estimator.

9. The method of claim 8, wherein the couple satisfaction estimator includes a relationship between an individual satisfaction index and one or more questions answered by the user.

10. The method of claim 1, further comprising:
    receiving a survey from the user, the user having provided answers to a plurality of inquiries in the survey, at least a portion of the answers being associated with a number;
    selecting a candidate to be matched with the user, the candidate having provided answers to a second survey, at least a portion of the answers provided by the candidate being associated with a number; and
    comparing at least a portion of the answers provided by the user and at least a portion of the answers provided by the selected candidate to a couple satisfaction estimator.

11. The method of claim 1, further comprising:
    inputting into a neural network information provided by the user; and
    receiving from the neural network the plurality of candidates based on the approximated relationship satisfaction and the approximated coupling satisfaction for each of the plurality of candidates.

12. The method of claim 1, further comprising:
    receiving a request by the user to communicate with a selected candidate at a requested communication level;
    determining whether the selected candidate is interested in communicating with the user; and
    facilitating communication between the user and the selected candidate at the requested communication level if it is determined that the selected candidate agreed to communicate with the user at the requested communication level.

13. A system of operating a matching service, comprising:
    a satisfaction approximator executed on a processor of the system, wherein the satisfaction approximator is configured to approximate a relationship satisfaction that a user of the matching service has in the relationships that the user forms with others; and
    a candidate identifier executed on the processor of the system, wherein the candidate identifier is configured to identify a plurality of candidates for a relationship with the user based on the approximated relationship satisfaction, wherein the satisfaction approximator is further configured to approximate a coupling satisfaction that the user will have in a relationship with each of the plurality of candidates.

14. The system of claim 13, wherein the satisfaction approximator is configured to approximate the relationship satisfaction that a user of the matching service has in the relationships that the user forms with others by generating an approximate individual satisfaction index for the user.

15. The system of claim 13, wherein the satisfaction approximator is configured to approximate the relationship satisfaction that a user of the matching service has in the relationships that the user forms with others by generating an individual satisfaction estimator.

16. The system of claim 15, wherein the individual satisfaction estimator includes a relationship between an individual satisfaction index and one or more questions answered by the user.

17. The system of claim 15, further comprising:
    a receiver executed on the processor of the system, wherein the receiver is configured to receive a survey from the user, the user having provided answers to a plurality of inquiries in the survey, at least a portion of the answers being associated with a number; and
    a comparator executed on the processor of the system, wherein the comparator is configured to compare answers provided by the user to an individual satisfaction estimator.

18. The system of claim 13, further comprising:
- a classifier executed on the processor of the system, wherein the classifier is configured to classify the user based on the approximated relationship satisfaction that the user has in the relationships that person forms with others; and
- a selector executed on the processor of the system, wherein the selector is configured to identifying the candidates such that the candidates fall within the same class as the user.

19. The system of claim 13, wherein the satisfaction approximator approximates the coupling satisfaction that the user will have in a relationship by generating an approximate couple satisfaction index for the user and a particular candidate.

20. The system of claim 13, wherein the satisfaction approximator approximates the coupling satisfaction that the user will have in a relationship by generating a couple satisfaction estimator.

21. The system of claim 20, wherein the couple satisfaction estimator includes a relationship between an individual satisfaction index and one or more questions answered by the user.

22. The system of claim 13, further comprising:
- a receiver executed on the processor of the system, wherein the receiver is configured to receive a survey from the user, the user having provided answers to a plurality of inquiries in the survey, at least a portion of the answers being associated with a number;
- a selector executed on the processor of the system, wherein the selector is configured to select a candidate to be matched with the user, the candidate having provided answers to a second survey, at least a portion of the answers provided by the candidate being associated with a number; and
- a comparator executed on the processor of the system, wherein the comparator is configured to compare at least a portion of the answers provided by the user and at least a portion of the answers provided by the selected candidate to a couple satisfaction estimator.

23. The system of claim 13, further comprising:
- a neural network executed on the processor of the system, wherein the neural network is configured to receive information provided by the user and determine the plurality of candidates based on the approximated relationship satisfaction and the approximated coupling satisfaction for each of the plurality of candidates.

24. The system of claim 13, further comprising:
- a communication platform executed on the processor of the system, wherein the communication platform is configured to:
  - receive a request by the user to communicate with a selected candidate at a requested communication level;
  - determine whether the selected candidate is interested in communicating with the user; and
  - facilitate communication between the user and the selected candidate at the requested communication level if it is determined that the selected candidate agreed to communicate with the user at the requested communication level.

* * * * *